United States Patent
Rodriguez et al.

(10) Patent No.: US 10,445,370 B2
(45) Date of Patent: Oct. 15, 2019

(54) COMPOUND INDEXES FOR GRAPH DATABASES

(71) Applicant: LinkedIn Corporation, Sunnyvale, CA (US)

(72) Inventors: Andrew Rodriguez, Palo Alto, CA (US); Scott M. Meyer, Berkeley, CA (US); Andrew J. Carter, Mountain View, CA (US); Walaa Eldin M. Moustafa, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 15/618,371

(22) Filed: Jun. 9, 2017

(65) Prior Publication Data

US 2018/0357330 A1 Dec. 13, 2018

(51) Int. Cl.
*G06F 16/30* (2019.01)
*G06F 16/901* (2019.01)
*G06F 16/903* (2019.01)

(52) U.S. Cl.
CPC ...... *G06F 16/9024* (2019.01); *G06F 16/9014* (2019.01); *G06F 16/90335* (2019.01)

(58) Field of Classification Search
None
See application file for complete search history.

(56) References Cited

U.S. PATENT DOCUMENTS

| 8,185,558 | B1 | 5/2012 | Narayanan et al. |
| 8,533,182 | B1 | 9/2013 | Charboneau |
| 8,736,612 | B1 | 5/2014 | Goldman et al. |
| 9,330,138 | B1 * | 5/2016 | Shankar ............ G06F 16/2452 |
| 9,378,303 | B1 | 6/2016 | Shankar et al. |
| 2003/0084043 | A1 | 5/2003 | Acharya et al. |

(Continued)

FOREIGN PATENT DOCUMENTS

| EP | 2937797 A1 | 10/2015 |
| WO | 2012091844 A1 | 7/2012 |

OTHER PUBLICATIONS

Lei, et al., "Summarization Graph Indexing: Beyond Frequent Structure-Based Approach", In Proceedings of International Conference on Database Systems for Advanced Applications, Mar. 2008, 15 Pages.

(Continued)

*Primary Examiner* — Tarek Chbouki
(74) *Attorney, Agent, or Firm* — Park, Vaughan, Fleming & Dowler LLP; Chia-Hsin Suen

(57) ABSTRACT

The disclosed embodiments provide a system for processing queries of a graph database. During operation, the system executes a set of processes for processing queries of a graph database storing a graph, wherein the graph comprises a set of nodes, a set of edges between pairs of nodes in the set of nodes, and a set of predicates. When a query of the graph database is received, the system performs a lookup of a hash map to obtain one or more offsets into a compound store for the graph database, which includes identity-giving nodes for a set of tuples in the graph database. Next, the system accesses the offset(s) in the compound store to obtain a subset of tuples matching the query. The system then uses the subset of tuples to generate a result of the query and provides the result in a response to the query.

17 Claims, 7 Drawing Sheets

(56) References Cited

U.S. PATENT DOCUMENTS

| | | | |
|---|---|---|---|
| 2006/0004851 A1* | 1/2006 | Gold | G06F 16/252 |
| 2007/0192306 A1 | 8/2007 | Papakonstantinou et al. | |
| 2007/0239694 A1 | 10/2007 | Singh et al. | |
| 2008/0116449 A1 | 5/2008 | Macready et al. | |
| 2008/0306910 A1 | 12/2008 | Singh | |
| 2009/0132503 A1 | 5/2009 | Sun et al. | |
| 2009/0228434 A1 | 9/2009 | Krishnamurthy et al. | |
| 2009/0240649 A1 | 9/2009 | Sereni et al. | |
| 2009/0240682 A1 | 9/2009 | Balmin et al. | |
| 2010/0223606 A1 | 9/2010 | Park et al. | |
| 2011/0131199 A1 | 6/2011 | Simon et al. | |
| 2011/0270861 A1 | 11/2011 | Arshaysky et al. | |
| 2012/0005224 A1 | 1/2012 | Ahrens et al. | |
| 2012/0047114 A1 | 2/2012 | Duan et al. | |
| 2012/0096043 A1 | 4/2012 | Stevens, Jr. | |
| 2012/0136884 A1 | 5/2012 | Kanawa | |
| 2012/0179644 A1 | 7/2012 | Miranker | |
| 2012/0284255 A1 | 11/2012 | Schechter et al. | |
| 2013/0097180 A1 | 4/2013 | Tseng | |
| 2014/0095446 A1 | 4/2014 | Deshmukh et al. | |
| 2014/0172914 A1 | 6/2014 | Elnikety et al. | |
| 2014/0201234 A1 | 7/2014 | Lee et al. | |
| 2014/0280044 A1 | 9/2014 | Huynh et al. | |
| 2014/0310302 A1 | 10/2014 | Wu et al. | |
| 2014/0330867 A1 | 11/2014 | Sarkar et al. | |
| 2014/0337373 A1 | 11/2014 | Morsi et al. | |
| 2015/0026158 A1 | 1/2015 | Jin | |
| 2015/0120717 A1 | 4/2015 | Kim et al. | |
| 2015/0120775 A1 | 4/2015 | Shao et al. | |
| 2015/0127677 A1 | 5/2015 | Wang et al. | |
| 2015/0134637 A1 | 5/2015 | Pall et al. | |
| 2015/0234894 A1 | 8/2015 | Dageville et al. | |
| 2015/0302300 A1 | 10/2015 | Fletcher et al. | |
| 2016/0063121 A1* | 3/2016 | Agarwal | G06Q 10/00 707/706 |
| 2016/0171540 A1 | 6/2016 | Mangipudi et al. | |
| 2016/0299991 A1* | 10/2016 | Hong | G06F 16/9024 |
| 2017/0090807 A1* | 3/2017 | Gupta | G06F 16/90 |
| 2018/0357328 A1 | 12/2018 | Meyer et al. | |
| 2018/0357329 A1 | 12/2018 | Meyer et al. | |

OTHER PUBLICATIONS

"International Search Report and Written Opinion Issued in PCT Application No. PCT/US17/067866", dated Mar. 8, 2018, 10 Pages. (MS# 902058-WO-PCT).

Prabhakaran, et al., "Managing Large Graphs on Multi-Cores With Graph Awareness", In Proceedings of the USENIX Conference on Annual Technical Conference, Jun. 13, 2012, 12 Pages.

Williams, et al., "Graph Database Indexing Using Structured Graph Decomposition", In Proceedings of 23rd International Conference on Data Engineering, Apr. 15, 2007, 10 Pages.

Drew Koszewnik; "The Nettlix Tech Blog: NetflixGraph Metadata Library: An Optimization Case Study", Jan. 18, 2013, XP055362100, retrieved from the internet: URL: http://techblog.netflix.com/2013/01/netflixgraph-metadata-library_18.html.

Daniel K Blandford et al: "An Experimental Analysis of a Compact Graph Representation", Workshop on Algorithms Engineering and Experiments (ALENEX), Jan. 1, 2004, XP055177526.

Stepanov A. A. et al, "SIMD-Based Decoding of Posting Lists", Proceedings of the 20th ACM Conference on Information and Knowledge Management, XP002759898, retrieved from the internet: URL: http://www.stepanovpapers.com/CIKM_2011.pdf, Oct. 24-28, 2011.

D. Lemire et al, "Decoding billions of integers per second through vectorization", Software Practice & Experience, vol. 45, No. 1, Jan. 1, 2015, XP055363887, pp. 1-29.

Dean; "Challenges in Building Large-Scale Information Retrieval Systems", Keynote of the 2nd ACM International Conference on Web Search and Data Mining (WSDM). 2009 http://videolectures.net/wsdm09_dean_cblirs/.

Wikipedia: "Delta Encoding", The Free Encyclopedia. Accessed at https://en.wikipedia.org/wiki/Delta_encoding Apr. 10, 2017.

* cited by examiner

COMPOUND INDEXES FOR GRAPH DATABASES

RELATED APPLICATIONS

The subject matter of this application is also related to the subject matter in a co-pending non-provisional application by inventors Andrew Rodriguez, Andrew Carter, Scott Meyer and Srinath Shankar, entitled "Edge Store Designs for Graph Databases," having Ser. No. 15/360,605, and filing date 23 Nov. 2016.

The subject matter of this application is also related to the subject matter in a co-pending non-provisional application by the same inventors as the instant application and filed on the same day as the instant application, entitled "Supporting Tuples in Log-Based Representations of Graph Databases," having Ser. No. 15/618,238, and filing date 9 Jun. 2017.

BACKGROUND

Field

The disclosed embodiments relate to graph databases. More specifically, the disclosed embodiments relate to compound indexes for graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
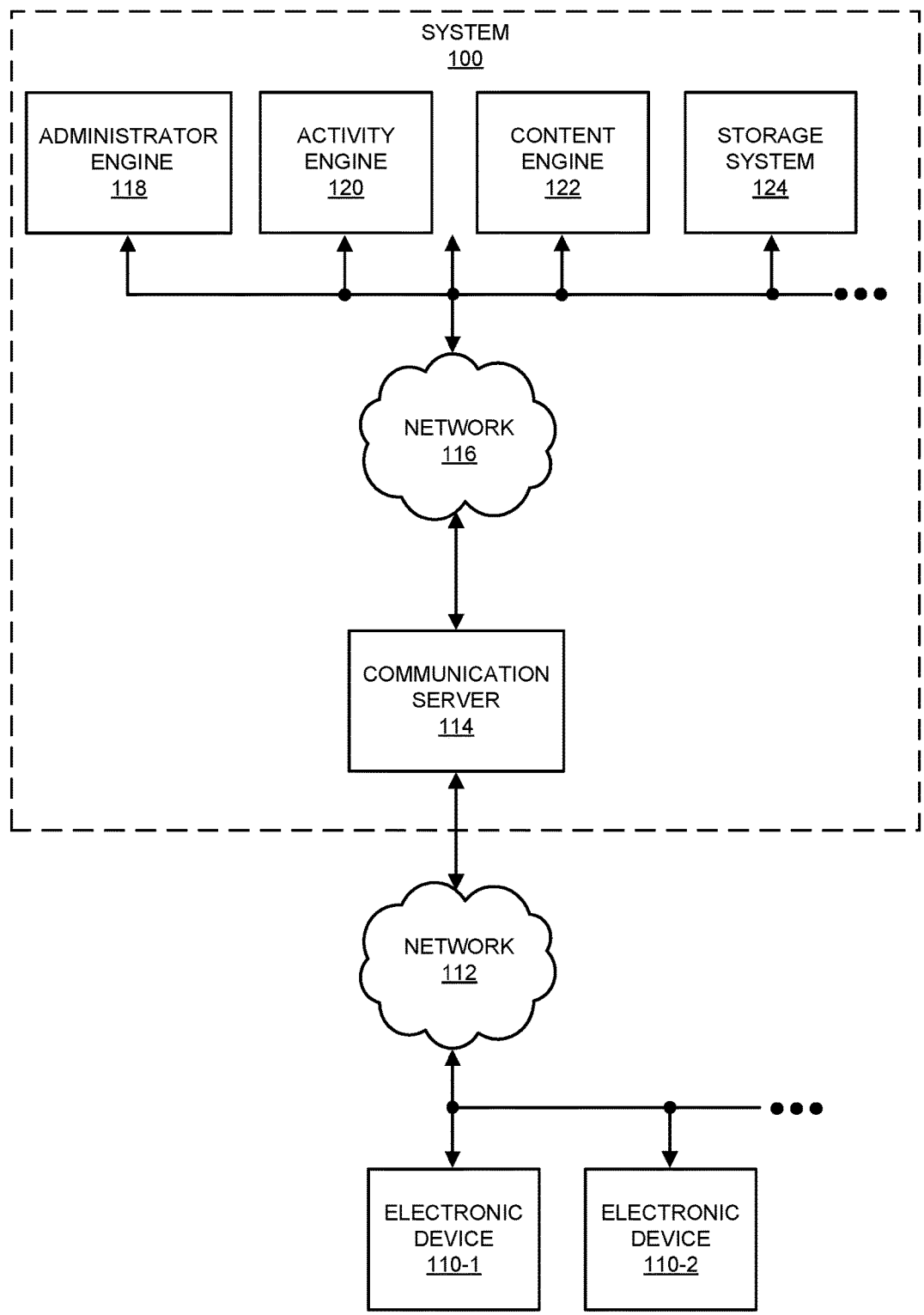
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
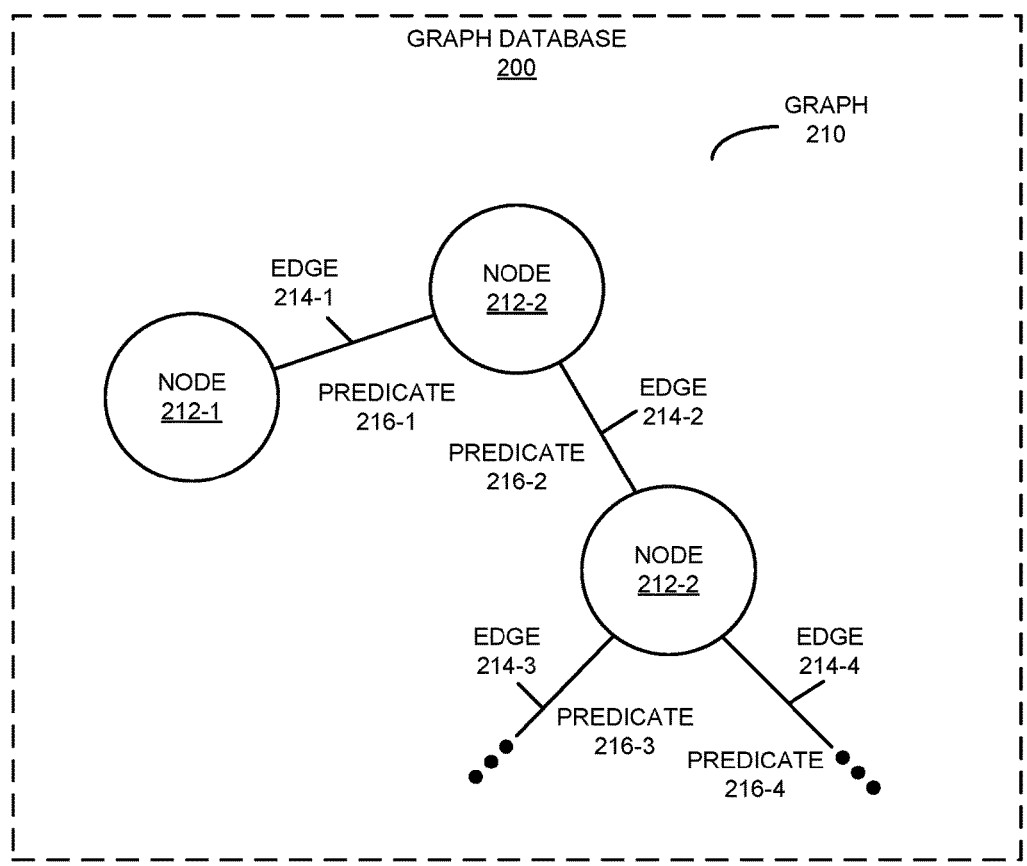
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Each edge in graph 210 may be specified in a (subject, predicate, object) triple. For example, an edge denoting a connection between two members named "Alice" and "Bob" may be specified using the following statement:

Edge("Alice", "ConnectedTo", "Bob")

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")?

A subsequent statement may modify the initial statement with a tilde to indicate deletion of the edge from graph database 200:

Edge~("Alice", "ConnectedTo", "Bob").

In addition, specific types of edges and/or more complex structures in graph 210 may be defined using schemas. Continuing with the previous example, a schema for employment of a member at a position within a company may be defined using the following:

```
DefPred("employ/company", "1", "node", "0", "node").
DefPred("employ/member", "1", " node", "0", "node").
DefPred("employ/start", "1", "node", "0", "date").
DefPred("employ/end_date", "1", "node", "0", "date").
M2C@(e, memberId, companyId, start, end) :-
    Edge(e, "employ/member", memberId),
    Edge(e, "employ/company", companyId),
    Edge(e, "employ/start", start),
    Edge(e, "employ/end_date", end)
```

In the above schema, a compound for the employment is denoted by the "@" symbol and has a compound type of "M2C." The compound is also represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

Consequently, compounds in queries of graph database 200 or otherwise stored in graph database 200 may model complex relationships (e.g., employment of a member at a position within a company) using a set of basic types (i.e., nodes 212, edges 214, predicates 216) in graph database 200. More specifically, each compound may represent an n-ary relationship in the graph, with each "component" of the relationship identified using the predicate and object (or subject) of an edge. A set of "n" edges that model the relationship may then be linked to the compound using a common subject (or object) that is set to a hub node representing the compound. In turn, new compounds may dynamically be added to graph database 200 without changing the basic types used in graph database 200 by specifying relationships that relate the compound structures to the basic types in schemas for the compounds.

Graph 210 and the associated schemas may additionally be used to populate graph database 200 for processing of queries against the graph. More specifically, a representation of nodes 212, edges 214, and predicates 216 may be obtained from a source of truth, such as a relational database, distributed filesystem, and/or other storage mechanism, and stored in a log in the graph database. Lock-free access to the graph database may be implemented by appending changes to graph 210 to the end of the log instead of requiring modification of existing records in the source of truth. In turn, the graph database may provide an in-memory cache of the log and an index for efficient and/or flexible querying of the graph.

In other words, nodes 212, edges 214, and predicates 216 may be stored as offsets in a log that is read into memory in graph database 200. For example, the exemplary edge statement for creating a connection between two members named "Alice" and "Bob" may be stored in a binary log using the following format:

| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in the log, offsets in the log may be used as identifiers for the changes. Continuing with the previous example, the offset of 275 may be used as a unique identifier for the edge representing the connection between "Alice" and "Bob." The offsets may additionally be used as representations of virtual time in the graph. More specifically, each offset in the log may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

As an alternative to edge-based representations in graph database 200, compounds may be formatted and/or stored as tuples in graph database 200. Each tuple may include a header with information related to the tuple, including a length of the tuple, a write operation (e.g., addition, deletion, or non-assertion) associated with the compound, and/or a set of cardinalities associated with predicates in the compound. The header may be followed by the compound type of the corresponding compound and a set of identity-giving nodes, with each identity-giving node containing a predicate-object pair that represents a corresponding attribute used to define the compound. The tuple may optionally store one or more non-identity-giving attributes associated with the n-ary relationship modeled in the compound. For example, the "M2C" compound described above may be supplemented by an optional attribute representing the job title associated with the member's employment at the company.

Consequently, the tuple may be a compact representation of the compound that is efficiently referenced and stored within a single entry of the log. Moreover, the tuple may be functionally equivalent to an edge set containing a hub node that identifies the tuple and predicate-object pairs from the tuple. Storing compounds in log-based representations of graph databases is described in a co-pending non-provisional application by the same inventors as the instant application and filed on the same day as the instant application, entitled "Supporting Tuples in Log-Based Representations of Graph Databases," having serial number TO BE ASSIGNED, and filing date TO BE ASSIGNED, which is incorporated herein by reference.

Note that graph database 200 may be an implementation of a relational model with constant-time navigation, i.e., independent of the size N, as opposed to varying as log(N). Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in U.S. Pat. No. 9,535,963 (issued 3 Jan. 2017), by inventors Srinath Shankar, Rob Stephenson, Andrew Carter, Maverick Lee and Scott Meyer, entitled "Graph-Based Queries," which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. For example, graph database 200 may be configured to store data associated with a variety of flexible schemas using edges representing subjects, objects, and predicates in the graph. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

The graph database may also include an in-memory index structure that enables efficient lookup of edges 214 of graph 210 by subject, predicate, object, and/or other keys or parameters. The index structure may include a hash map and an edge store. Entries in the hash map may be accessed using keys such as subjects, predicates, and/or objects that partially define edges in the graph. In turn, the entries may include offsets into the edge store that are used to resolve and/or retrieve the corresponding edges. Edge store designs for graph database indexes are described in a co-pending non-provisional application by inventors Andrew Rodriguez, Andrew Carter, Scott Meyer and Srinath Shankar, entitled "Edge Store Designs for Graph Databases," having Ser. No. 15/360,605, and filing date 23 Nov. 2016, which is incorporated herein by reference.

Figure 3:
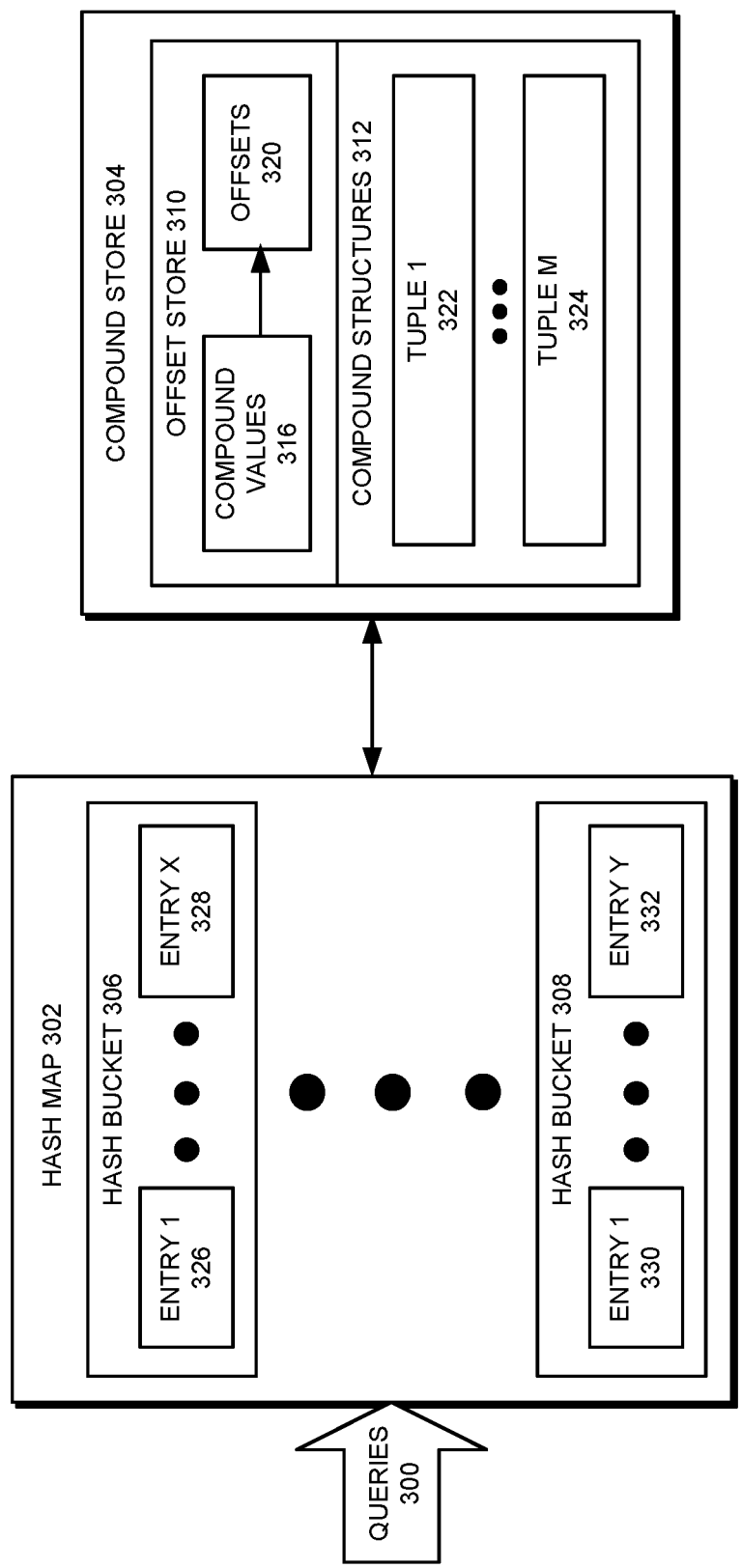
FIG. 3 shows an index structure for a graph database in accordance with the disclosed embodiments.

Index structures for the graph database may also be adapted for use with compounds stored in the graph database. As shown in FIG. 3, an index structure may include a hash map 302 and a compound store 304 for use in processing queries 300 of the graph database. Hash map 302 and compound store 304 may be accessed simultaneously by a number of processes, including a single write process and multiple read processes. In turn, the processes may read from the index structure, write to the index structure, and/or process deleted edges using the index structure, as described in further detail below.

Hash map 302 may include a set of fixed-size hash buckets 306-308, each of which contains a set of fixed-size entries (e.g., entry 1 326, entry x 328, entry 1 330, entry y 332). Each entry in the hash map may include one or more keys and one or more values associated with the key(s). The keys may include attributes by which the graph database is indexed, and the values may represent attributes in the graph database that are associated with the keys. For example, the keys may be compound types and/or identity-giving nodes that partially define compounds in the graph, and the values may include offsets into compound store 304 that are used to resolve the compounds into instances that are stored as tuples.

A hash bucket may also include a reference to an overflow bucket containing additional hash table entries with the same hash as the hash bucket. While the hash bucket has remaining capacity, the hash bucket may omit a reference to any overflow buckets. When the remaining capacity of the hash bucket is consumed by entries in the hash bucket, an overflow bucket is instantiated in the hash table, additional entries are stored in the overflow bucket, and a reference to the overflow table is stored in a header and/or an entry in the hash bucket.

When a query of the graph database is received, a key in the query may be matched to an entry in hash map 302, and an offset in the entry is used to retrieve a corresponding set of tuples from compound store 304. For example, the key may include an identity-giving node and/or compound type for one or more tuples stored in a log-based representation of the graph database. A hash of the key may be used to identify a hash bucket in hash map 302, and another hash of the key may be used to identify the corresponding entry in the hash bucket. Because the hash buckets and entries are of fixed size, a single calculation (e.g., a first hash of the key modulo the number of hash buckets+a second hash of the key modulo the number of entries in each hash bucket) may be used to identify the offset or address of the corresponding entry in the hash map. In turn, the same entry may be reused to store a different fixed-size value instead of requiring the creation of another entry in the hash bucket to store the fixed-size value.

An offset into compound store 304 may be obtained from the entry and used to retrieve and/or modify a set of tuples matching the query. In particular, compound store 304 may include an offset store 310 that contains additional offsets 320 into compound store 304, as well as a set of compound structures 312 referenced by offsets specified in hash map 302 and/or offset store 310.

Compound structures 312 may store sets of tuples (e.g., tuple 1 322, tuple m 324) that can be used to process queries containing compounds in the graph database. For example, one or more tuples may be read from compound structures 312 in response to a read query of the graph database. In another example, one or more tuples may be added to compound structures 312 in response to a write query of the graph database. Each record in compound structures 312 may include all fields required to resolve the tuple. For example, the tuple may include an offset of the last update to the tuple in a log-based representation of the graph database, an identifier for a hub node representing the compound stored in the tuple, a compound type, a list of identity-giving nodes, a list of optional attributes, an add/delete indication, and/or a non-assertion indication.

Offset store 310 may map from compound values 316 in the tuples to one or more additional offsets 320 in offset store 310 and/or compound structures 312 that can be used to retrieve the tuples. Compound values 316 may include identity-giving nodes, compound types, and/or other attributes that are used to define or "declare" the tuples. For example, a value of a given identity-giving node in a compound may be used as a key that is matched to an entry in hash map 302. The entry may include an offset into offset store 310 that specifies, for that identity-giving node, a set of compound types mapped to offsets in compound structures 312. Each offset into compound structures 312 may be used to obtain one or more tuples containing the identity-giving node and the compound type to which the offset is mapped in offset store 310.

Offset store 310 may be used to manage larger sets of tuples for identity-giving nodes and/or other keys used with hash map 302. For example, larger sets of tuples for a given identity-giving node value may further be filtered by compound type and/or additional compound values 316 in offset store 310 before the tuples are resolved using offsets 320 into compound structures 312. As a result, tuples in compound structures 312 may be accessed through hash map 302 and offset store 310 when resolving queries using additional levels of indirection is more efficient. Conversely, the tuples may be accessed directly from hash map 302 when resolving queries by filtering a set of tuples in a compound structure by additional compound values is more efficient.

Figure 4:
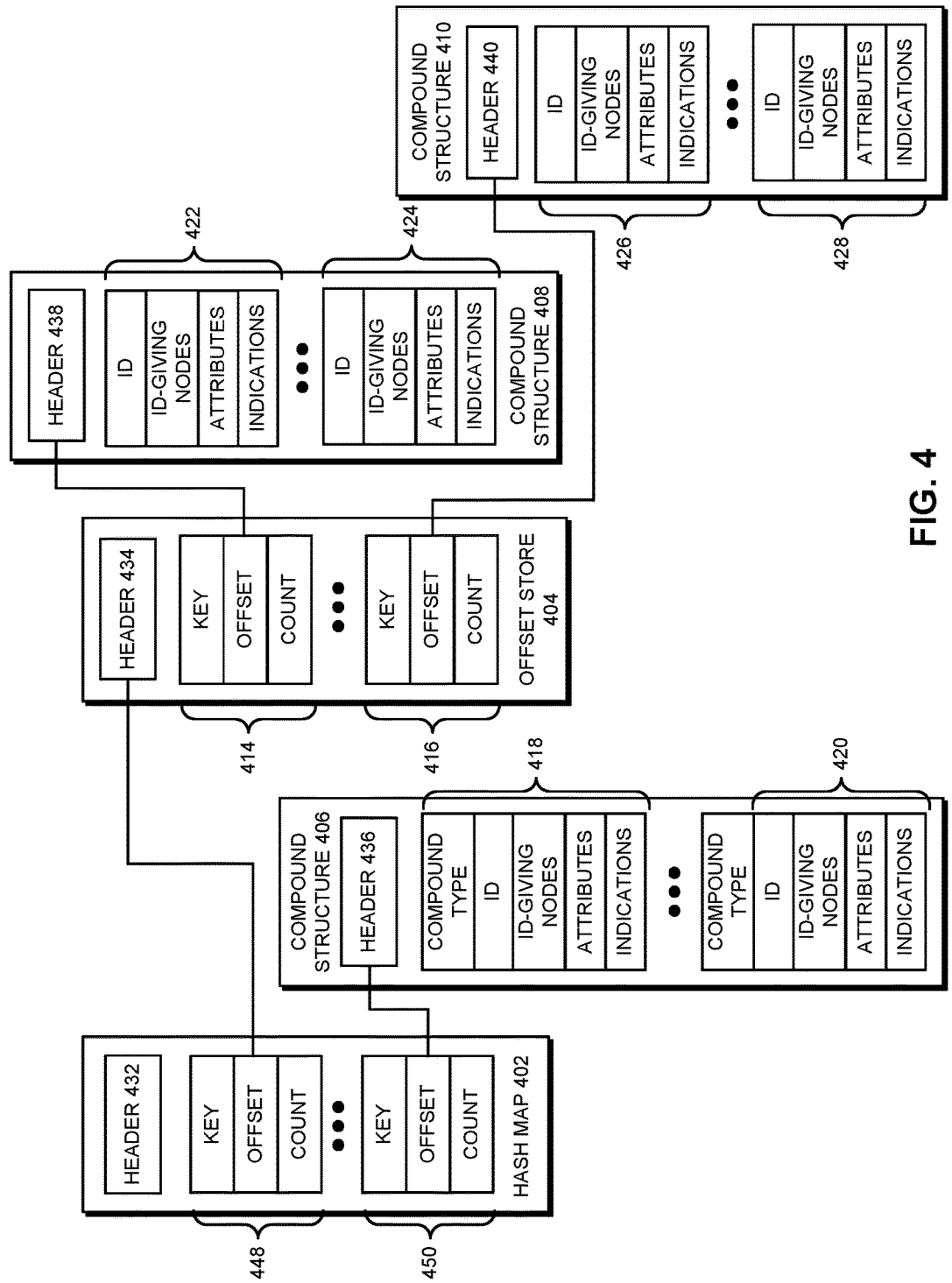
FIG. 4 shows an exemplary compound index for a graph database in accordance with the disclosed embodiments.

FIG. 4 shows an exemplary index structure for a graph database in accordance with the disclosed embodiments. As shown in FIG. 4, the index structure includes a hash map 402 and a compound store, which includes the combination of an offset store 404 and three compound structures 406-410.

As mentioned above, queries of the graph database may initially be processed by using lookups of hash map 402 to obtain offsets into the compound store. For example, hash map 402 may be used to perform a lookup by a first compound value in the graph database, such as an identity-giving node and/or compound type for one or more compounds. The types of values indexed in hash map 402 (e.g., types of identity-giving nodes, compound types, etc.) may be specified in a header 432 for hash map 402. Header 432 may also contain other attributes, such as a numeric version of the index structure, a total size of the hash map, a number of hash buckets in the hash map, a fixed size of the hash buckets, and/or a fixed size of entries in the hash buckets.

Parameters from the queries may be used as keys that are matched to entries 448-450 in hash map 402. For example, a first hash may be applied to an identity-giving node value from a query to identify a hash bucket in hash map 402, and a second hash of the subject value may be used to identify a corresponding hash map entry (e.g., entries 448-450) in the hash bucket. The hash map entry may then be read to obtain a key, an offset, and a count associated with the subject value. Continuing with the previous example, the key may be stored as a hashed value of the identity-giving node value, the offset may be a memory address in the compound store, and the count may specify the number of records in the compound store to which the key maps.

Within the compound store, offset store 404 and compound structures 406-410 may each contain a header and a number of records 414-428. Each record 422-428 in compound structures 408-410 may store tuples that are indexed using hash map 402 and offset store 404. On the other hand, records 418-420 in compound structure 406 may be indexed directly from hash map 402.

After one or more parameters of a query are matched to an entry (e.g., entries 448-450) in hash map 402, the offset may be retrieved from the entry and used to access the compound store. As shown in FIG. 4, the offset stored in entry 448 may reference header 434 and/or a beginning of offset store 404, and the offset stored in entry 450 may reference header 436 and/or a beginning of compound structure 406. Each referenced offset may be used to access a set of tuples matching the key for the corresponding hash map entry.

In particular, the offset stored in entry 450 may be used to access header 436 and records 418-420 in compound structure 406. Records 418-420 may store a set of tuples that share a compound value associated with entry 450. For example, compound structure 406 may store tuples with the same predicate-object pair defining an identity-giving node that is used as a key to retrieve entry 450 in hash map 402. Because compound structure 406 may store tuples with different compound types, each record in compound structure 406 may include a compound type for the corresponding tuple. The record may also include an identifier (ID) for the tuple, such as an offset in a log-based representation of the graph database at which the tuple was most recently updated.

The record may further include a set of identity-giving nodes that define the tuple. For example, the record may include values of predicate-object pairs that distinguish between different tuples that share the compound value used as a key to retrieve entry 450 in hash map 402. The identity-giving nodes may optionally be followed by one or more non-identity-giving attributes that reference the tuple but are not required to define the tuple.

Finally, the record may include a set of indications. For example, the record may include an add/delete indication as a bit, flag, and/or other data type that identifies the record as an addition of the tuple to the graph database or a deletion of the tuple from the graph database. The add/delete indication may thus allow tuple additions and deletions to be stored in the same compound structure (e.g., table) instead of in separate structures. The record may also include a non-assertion indication that is used to indicate or "declare" an instance of a compound without asserting the instance as added or deleted in the graph database. As a result, the non-assertion indication may be set to refer to the instance in the graph database without changing the existence of the instance in the graph, as described in the above-referenced application entitled "Supporting Tuples in Log-Based Representations of Graph Databases."

For example, the graph database may include the following schema for endorsement of a skill in an online professional network:

```
DefPred("endorser", "1", "node", "0", "node").
DefPred("endorsee", "1", " node", "0", "node").
DefPred("skill", "1", "node", "0", "node").
Endorsement@(h, Endorser, Endorsee, Skill) :-
    Edge(h, "endorser", Endorser),
    Edge(h, "endorsee", Endorsee),
    Edge(h, "skill", Skill).
```

In the above schema, a compound is declared using the "@" symbol and specifies "Endorsement" as a compound type. The compound is represented by three predicates defined as "endorser," "endorsee," and "skill." The "endorser" predicate may represent a member making the endorsement, the "endorsee" predicate may represent a member receiving the endorsement, and the "skill" predicate may represent the skill for which the endorsement is given. The declaration is followed by a rule that maps the three predicates to three edges. The first edge uses the first predicate to identify the endorser as the value specified in an "Endorser" parameter, the second edge uses the second predicate identify the endorsee as the value specified in an "Endorsee" parameter, and the third edge uses the third predicate to specify the skill as the value specified in a "Skill" parameter. All three edges share a common subject denoted by "h," which functions as a hub node that links the edges to form the compound relationship. Consequently, the schema may declare a trinary relationship for the "Endorsement" compound 402, with the relationship defined by identity-giving attributes with types of "endorser," "endorsee," and "skill" and values attached to the corresponding predicates.

An instance of the "Endorsement" compound may be created using the following statement:

```
Endorsement@(h, "Alice", "Bob", "C++"),
    Edge(h, "score", "3.0").
```

The instance may be modeled as a tuple that is stored in a log-based representation of the graph database, as well as an index for the graph database. Within a compound structure of the index, a record for the instance may include the offset of the tuple in the log-based representation, an identifier for the hub node, and the following set of predicate-object pairs:

```
[("endorser", "Alice"), ("endorsee", "Bob"),
    ("skill", "C++")]
[{"score", "3.0"}]
```

The first set of three predicate-object pairs may store the three identity-giving nodes of the "Endorsement" compound instance, and the last set of one predicate-object pair may store the optional "score" attribute attached to the instance using the edge following the "Endorsement" instantiation. Finally, the record may include a set of flags specifying addition, deletion, or nonassertion of the instance in the graph database.

The offset stored in entry 448 may be used to access header 434 and records 414-416 in offset store 404. Records 414-416 may be associated with tuples containing a first compound type associated with entry 448. For example, a common identity-giving node associated with records 414-416 may be used as a key for retrieving entry 448 from hash map 402. Unlike records 418-420 of compound structure 406, records 414-416 in offset store 404 may store data that is similar to entries 448-450 in hash map 420. For example, each record in offset store 404 may specify a second compound value for tuples containing the first compound value associated with entry 448, an offset into another compound structure 408-410, and counts of the numbers of tuples and/or records in the other compound structure.

The offset stored in record 414 may be used to access compound structure 408, and the offset stored in record 416 may be used to access compound structure 410. For example, the offset stored in record 414 may reference header 438 and/or the beginning of compound structure 408, and the offset stored in record 416 may reference header 440 and/or the beginning of compound structure 410.

Compound structure 408 may contain additional records 422-424 that store tuples with a first compound value associated with entry 448 and a second compound value associated with record 414. Compound structure 410 may contain records 426-428 that store tuples with a first compound value associated with entry 448 and a second compound value associated with record 416. Records 422-428 may each include an ID for a tuple containing two compound values represented by the corresponding entry 448 in hash map 402 and records 414-416 in offset store 404. Each record in compound structures 408-410 may also include a set of predicate-object pairs that define identity-giving nodes and/or optional attributes in the corresponding tuples. Records 422-428 may further include add, delete, and/or non-assertion indications for the corresponding tuples.

Because a given tuple may be indexed by multiple identity-giving nodes, the tuple may appear multiple times in the compound store. For example, the tuple may include a first identity-giving node (e.g., a member ID) that is found in a relatively small number of tuples. As a result, the tuple may be stored with other tuples that contain the first identity-giving node in compound structure 406. On the other hand, the tuple may include a second identity-giving node (e.g., a company ID) that is found in a much larger number of tuples. In turn, the tuple may be stored in compound structure 408 or 410, along with a set of other tuples that contain the second identity-giving node and another common compound value (e.g., compound type).

Headers 434-440 may store information that is used to define and access tuples in the compound store. For example, header 434 may identify the compound value (e.g., a value of an identity-giving node) used as a key in entry 448 of hash map 402 to retrieve the offset of offset store 404. Header 436 may similarly specify the compound value used as a key in entry 450 of hash map 402 to retrieve the offset of compound structure 406. Header 438 may identify a second compound value (e.g., compound type) used as a key in entry 414 of offset store 404 to retrieve the offset of compound structure 408, and header 440 may identify a separate second compound value used as a key in entry 416 of offset store 404 to retrieve the offset of compound structure 410. If headers 438-440 specify a common compound type shared by all tuples in the corresponding compound structures 408-410, a field for the compound type may be omitted from records in compound structures 408-410. Consequently, compound values specified in headers 436-440 may be shared by tuples in the corresponding compound structures 406-410.

Headers 434-440 may also store information such as sizes, record counts, and/or other attributes associated with the corresponding portions of the compound store (i.e., offset store 404 and compound structures 406-410). As discussed in the above-referenced application entitled "Edge Store Designs for Graph Databases," headers 434-440 may include offsets that point to the previous or next page in offset store 404 and compound structures 406-410, respectively. Moreover, one or more headers 406-410 may include offsets that point to an edge store for the graph database. The edge store may contain one or more linkages for resolving high-cardinality predicate-object pairs in tuples of the corresponding compound structures (e.g., compound structures 406-410). For example, a tuple representing a unique group of members in an online professional network may include identity-giving nodes that specify the name of the group and a set of members in the group. Because the set of members is represented by the same high-cardinality predicate (e.g., "memberOf") in the tuple, a potentially large number of identity-giving nodes for the members may be omitted from a compound structure storing the tuple. Instead, the header for the compound structure may include an offset into an edge store that contains edges associated with the predicate, and the record containing the tuple in the compound structure may optionally contain an offset in the edge store that contains edges defining the set of members in the group.

Those skilled in the art will appreciate that the index may include other types of hash maps, structures, and/or data for facilitating efficient processing of graph database queries. For example, the index may include a second hash map with entries that store offsets into one or more additional compound structures. Keys to the second hash map may include hashes of two compound values in tuples of the graph database. As a result, the second hash map may be used to resolve, with one less level of indirection than hash map 402, queries that specify two or more compound types in tuples or compounds in the graph database. In another example, the index structure may include hash maps and/or structures with more than two compound types. In a third example, sets of tuples may be stored in different types and/or combinations of hash maps and compound structures to balance the overhead associated with filtering tuples by one or more compound values with the overhead of using multiple hops among the hash maps and compound structures to match the queries to the tuples.

A query of the graph database may be processed by reading and/or writing entries in the index structure. For example, a read query may be processed by obtaining one or more offsets from hash map 402 and/or offset store 404 and producing a result containing non-deleted tuples from records 422-424, records 418-420, and/or records 426-428 accessed using the offset(s). The result may then be returned in response to the query. In another example, a write query may be processed by linking to one or more tuples in compound structures 406-410 through hash map 402 and/or offset store 404 and writing IDs, compound types, identity-giving nodes, attributes, and/or indications for the tuples to compound structures 406-410.

In one or more embodiments, the index structure of FIG. 4 is accessed in a lock-free manner by a set of processes. The processes may include a single write process and multiple read processes that map blocks in physical memory in which the hash table and compound store are stored into their respective virtual address spaces. As a result, the processes may access hash buckets, entries, records, and/or other portions of the index structure using offsets in the blocks instead of physical memory addresses.

While writes to the index structure are performed in an append-only manner by the single write process, the read processes may read from the index structure. To ensure that read queries of the graph database produce consistent results, the read processes may process the read queries according to the virtual time at which the read queries were received. As mentioned above, each offset in a log-based representation of the graph database may represent a different virtual time in the graph, and changes in the log up to the offset may be used to establish a state of the graph at the virtual time. A read query may thus be processed by matching the query time of the query (e.g., the time at which the query was received) to the latest offset in the log-based representation at the query time, using hash map 402 and the compound store to access a set of tuples and/or edges matching the query, and generating a result of the query by materializing updates to the tuples and/or edges before the virtual time.

Figure 5:
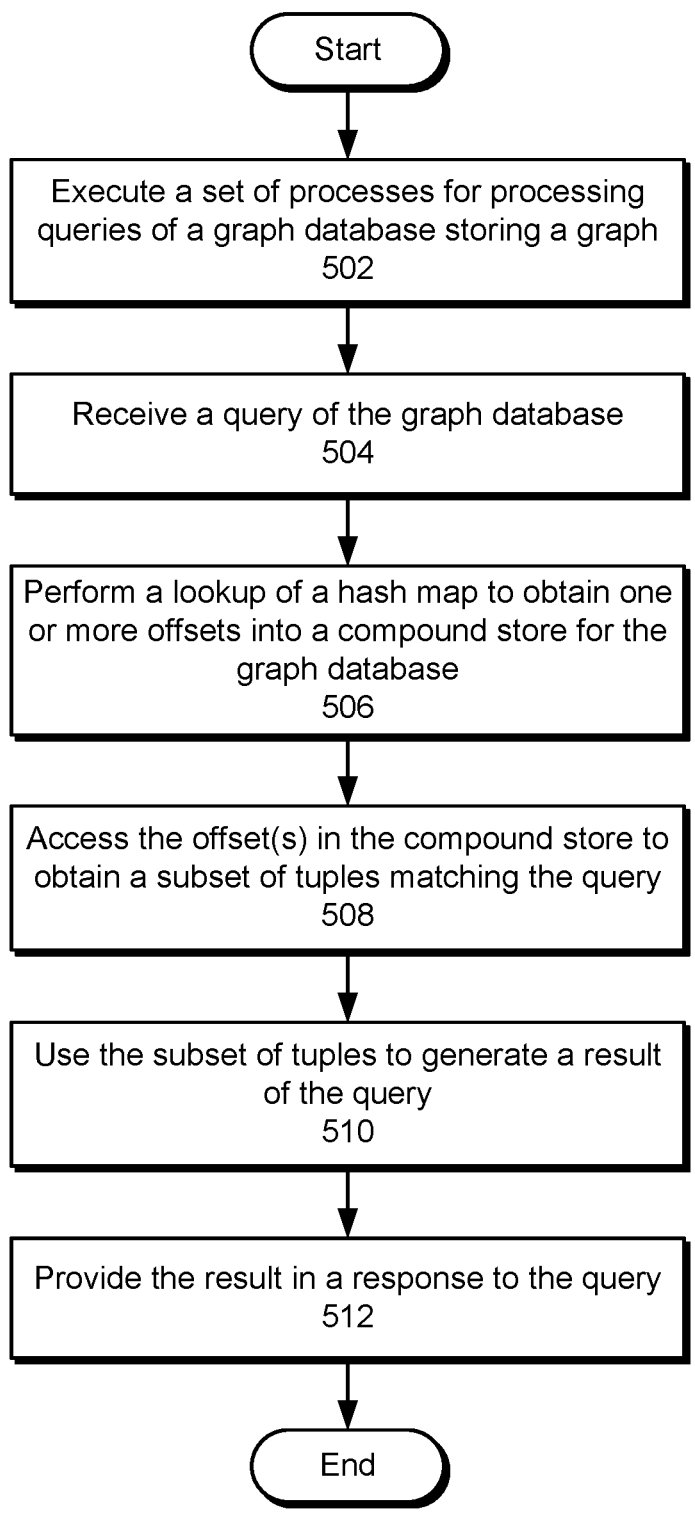
FIG. 5 shows a flowchart illustrating a process of providing an index to a graph database in accordance with the disclosed embodiments.

FIG. 5 shows a flowchart illustrating a process of providing an index to a graph database in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a set of processes for processing queries of a graph database storing a graph is executed (operation 502). The processes may include a single write process and multiple read processes that access the graph database and/or an index structure for the graph database in a lock-free manner. The graph may include a set of nodes, a set of edges between pairs of nodes, and a set of predicates. The graph database may also include compounds representing n-ary relationships that are stored as tuples in a log-based representation of the graph database. Next, a query of the graph database is received (operation 504). For example, the query may be used to read and/or write one or more edges or tuples tuples in the graph database.

The query may be processed by one or more of the processes. First, a lookup of a hash map is performed to obtain one or more offsets into a compound store for the graph database (operation 506). The offset(s) are accessed to obtain a subset of tuples matching the query (operation 508), as described in further detail below with respect to FIG. 6. The subset of tuples is then used to generate a result of the query (operation 510).

Finally, the result is provided in a response to the query (operation 512). For example, the result may include the subset of tuples matching one or more parameters of a read query. In another example, the result may include a processing status (e.g., successful, unsuccessful, etc.) associated with processing a write query that writes the subset of tuples to the graph database, hash map, and/or compound store.

Figure 6:
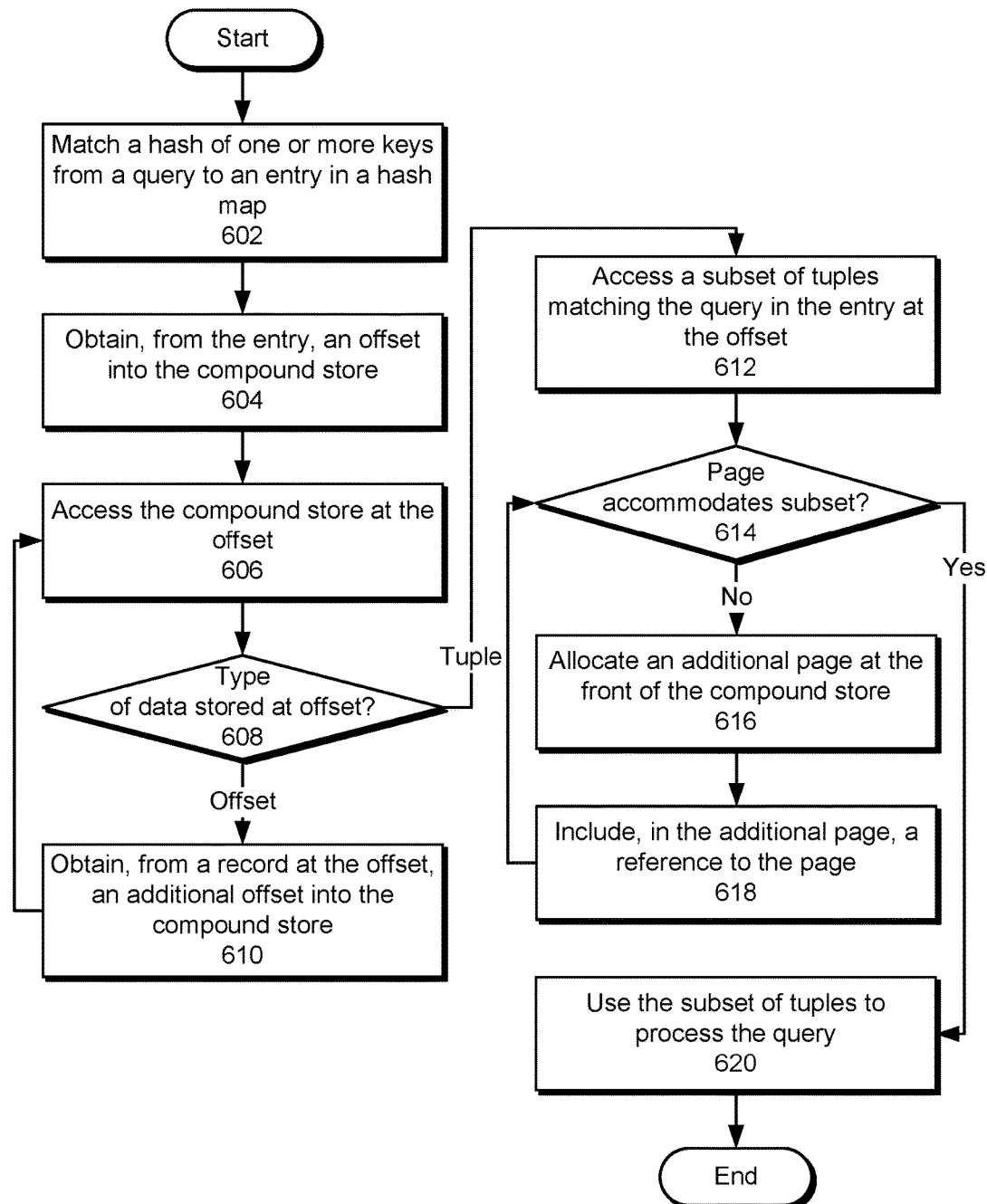
FIG. 6 shows a flowchart illustrating a process of accessing a compound store for a graph database in accordance with the disclosed embodiments.

FIG. 6 shows a flowchart illustrating a process of accessing a compound store for a graph database in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, a hash of one or more keys from a query is matched to an entry in a hash map (operation 602). For example, a first hash of one or more compound values (e.g., identity-giving nodes, compound types, etc.) may be mapped to a hash bucket in the hash map, and a second hash of the compound values may be mapped to an entry in the hash bucket. Next, an offset into the compound store is obtained from the entry (operation 604), and the compound store is accessed at the offset (operation 606). For example, the offset may be used to read and/or write data stored at the offset.

Subsequent access to the compound store may depend on the type of data stored at the offset (operation 608). If a record at the offset stores a tuple, a subset of tuples matching the query is accessed at the offset (operation 612). For example, data that is directly referenced by the hash map may include offsets (e.g., IDs) of the tuples in a log-based representation of the graph database, compound types of the tuples, identity-giving nodes in the tuples, optional attributes associated with the tuples, and/or an add, delete, or non-assertion indication for each tuple.

If a record at the offset stores an additional offset into the compound store, the additional offset is obtained from the record (operation 610), and the compound store is accessed at the additional offset (operation 606). The additional offset may be stored with a compound value. For example, the additional offset may be stored with a second compound value shared by tuples at the offset, which in turn is accessed using a hash of a first compound value shared by the same tuples. Operations 606-610 may be repeated until the type of data stored at a referenced offset is a tuple. In turn, records at the referenced offset may include offsets of tuples in the log-based representation, identity-giving nodes and optional attributes in the tuples, and the add/delete/non-assertion indication. Once a tuple is found at the offset, a subset of tuples matching the query is accessed at the offset (operation 612). For example, the offset may be used to read and/or write records storing the subset of tuples in the compound store.

The query may then be processed based on the ability of a page in the compound store to accommodate the subset of tuples (operation 614). For example, the page may accommodate a read query that reads one or more existing tuples from the page and/or other pages in the compound store. On the other hand, the page may be unable to accommodate a write query that writes one or more new tuples to the page if the remaining capacity of the page is not sufficient to store the new tuples.

If the page can accommodate the subset of tuples, the subset of tuples is used to process the query (operation 620). For example, the query may be processed by reading and/or writing the subset of tuples in the page. If the page cannot accommodate the subset of tuples, an additional page is allocated at the front of the compound store (operation 616), and a reference to the page is included in the additional page (operation 618). Operations 614-618 may be repeated until pages in the compound store can accommodate the subset of tuples in the query. After one or more additional pages are allocated and configured to reference older pages in the compound store, the subset of edges is written to the allocated page(s) and/or otherwise used to process the query (operation 620).

Figure 7:
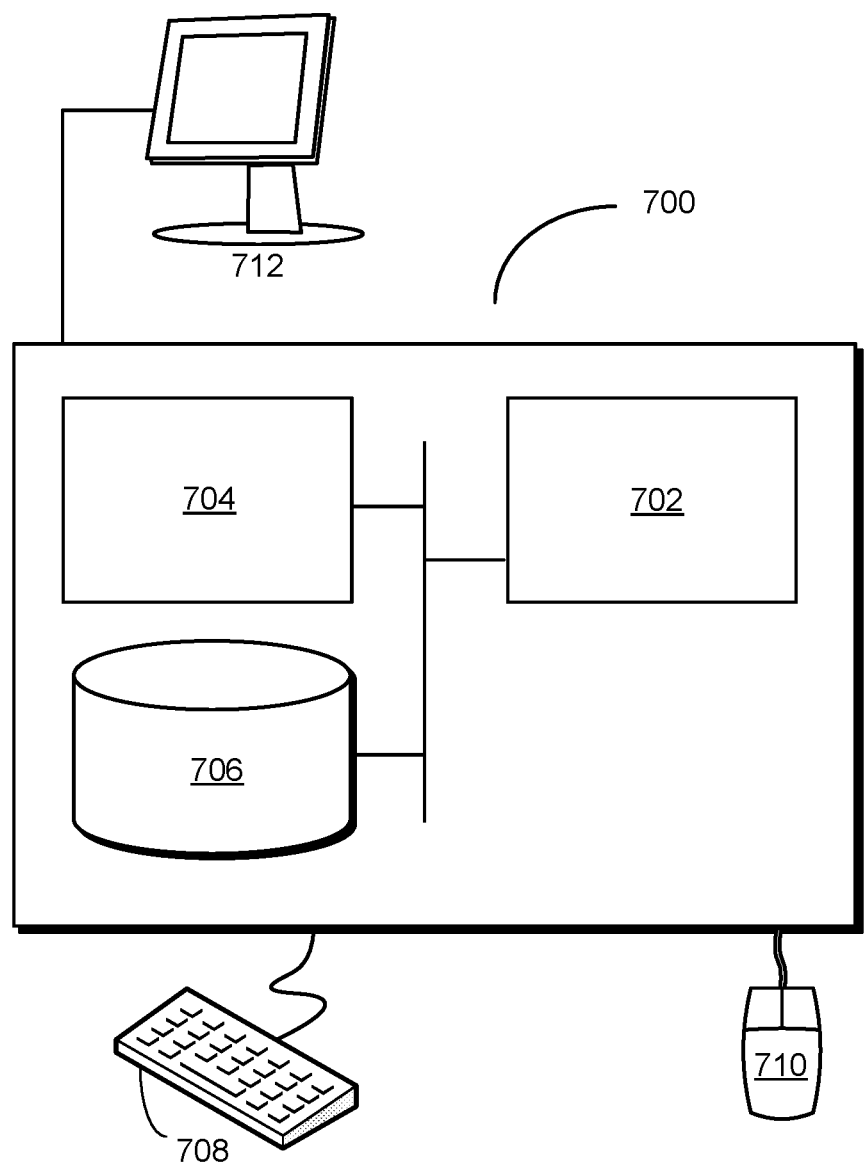
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for processing queries of a graph database. The system includes a set of processes, which may include a single write process and multiple read processes. When a query of the graph database is received, one or more of the processes may process the query by performing a lookup of a hash map to obtain one or more offsets into a compound store for the graph database. The compound store may store a set of identity-giving nodes for a set of tuples in the graph database. Next, the process(es) may access the one or more offsets in the compound store to obtain a subset of the tuples matching the query. The process(es) may then use the subset of the tuples to generate a result of the query. Finally, the process(es) may provide the result in a response to the query.

In addition, one or more components of computer system 700 may be remotely located and connected to the other components over a network. Portions of the present embodiments (e.g., hash map, compound store, log-based representation, processes, etc.) may also be located on different nodes of a distributed system that implements the embodiments. For example, the present embodiments may be implemented using a cloud computing system that processes queries of a distributed graph database from a set of remote users and/or clients.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
executing a set of processes for processing queries of a graph database storing a graph, wherein the graph comprises a set of nodes, a set of edges between pairs of nodes in the set of nodes, and a set of predicates; and
when a query of the graph database is received, using one or more of the processes to process the query by:
performing a lookup of a hash map to obtain one or more offsets into a compound store for the graph database, wherein the compound store comprises a set of identity-giving nodes for a set of tuples in the graph database;
accessing the one or more offsets in the compound store to obtain a subset of the tuples matching the query by:
obtaining, from the lookup of the hash map, a first offset in the compound store by matching a key in the query to an entry in the hash map which stores the first offset;
obtaining, from a record at the first offset in an offset store in the compound store, a second offset in the compound structure; and
accessing the subset of the tuples at the second offset in the compound structure;
using the subset of the tuples to generate a result of the query; and
providing the result in a response to the query.

2. The method of claim 1, wherein the offset store comprises:
a compound type associated with the compound structure; and
the second offset which specifies a storage location in the compound structure.

3. The method of claim 1, wherein using the first offset in the compound store to access the subset of the tuples matching the query in the compound structure comprises:
accessing the subset of the tuples at the first offset in the compound structure.

4. The method of claim 1, wherein the compound structure comprises:
an additional offset of a tuple in a log-based representation of the graph database;
the set of identity-giving nodes in the tuple, wherein each identity-giving node in the set of identity-giving nodes contains a predicate-object pair that represents a corresponding attribute used to define the tuple; and
an add/delete indication in the tuple that identifies the tuple as an addition of the tuple to the graph database or a deletion of the tuple from the graph database.

5. The method of claim 4, wherein the compound structure further comprises:
one or more attributes that reference the tuple.

6. The method of claim 5, wherein each node in the set of identity-giving nodes comprises a predicate-object pair.

7. The method of claim 1, wherein a header of the compound structure comprises:
a second offset of a next page in the compound structure; and
a third offset of an edge store in the graph database.

8. The method of claim 1, wherein performing the lookup of the hash map comprises:
matching a hash of one or more keys from the query to a hash map entry in the hash map; and
obtaining, from the hash map entry, an offset into the compound store.

9. The method of claim 8, wherein the one or more keys comprise at least one of:
an identity-giving node; and
a compound type.

10. The method of claim 1, wherein prior to obtaining the second offset from the record, the method further includes using the first offset to identify the record in the offset store, wherein the record includes an identity-giving node and a set of compound types.

11. The method of claim 10, wherein obtaining, from the record in the offset store in the compound store, the second offset in the compound structure includes:
identifying from the set of compound types, a compound type which matches a value in the query; and
obtaining the second offset in the offset store based on the identified compound type which is mapped to the second offset, wherein the second offset is mapped to the subset of the tuples.

12. An apparatus, comprising:
one or more processors; and
memory storing instructions that, when executed by the one or more processors, cause the apparatus to:
execute one or more processes for providing a graph database storing a graph, wherein the graph comprises a set of nodes, a set of edges between pairs of nodes in the set of nodes, and a set of predicates; and
when a query of the graph database is received, use one or more of the processes to process the query by:
performing a lookup of a hash map to obtain one or more offsets into a compound store for the graph database, wherein the compound store comprises a set of identity-giving nodes for a set of tuples in the graph database;
accessing the one or more offsets in the compound store to obtain a subset of the tuples matching the query by:
obtaining, from the lookup of the hash map, a first offset in the compound store by matching a key in the query to an entry in the hash map which stores the first offset;
obtaining, from a record at the first offset in an offset store in the compound store, a second offset in the compound structure; and
accessing the subset of the tuples at the second offset in the compound structure;
using the subset of the tuples to generate a result of the query; and
providing the result in a response to the query.

13. The apparatus of claim 12, wherein the offset store comprises:
a compound type associated with the compound structure; and
the second offset which specifies a storage location in the compound structure.

14. The apparatus of claim 12, wherein using the first offset in the compound store to access the subset of the tuples matching the query in the compound structure comprises:
accessing the subset of the tuples at the first offset in the compound structure.

15. The apparatus of claim 12, wherein the compound structure comprises:
an additional offset of a tuple in a log-based representation of the graph database;
the set of identity-giving nodes in the tuple, wherein each identity-giving node in the set of identity-giving nodes contains a predicate-object pair that represents a corresponding attribute used to define the tuple; and
an add/delete indication in the tuple that identifies the tuple as an addition of the tuple to the graph database or a deletion of the tuple from the graph database.

16. The apparatus of claim 12, wherein performing the lookup of the hash map comprises:
matching a hash of one or more keys from the query to a hash map entry in the hash map; and
obtaining, from the hash map entry, an offset into the compound store.

17. A system, comprising:
one or more processors;
a management module comprising instructions that, when executed by the one or more processors, cause the system to execute a set of processes for processing queries of a graph database storing a graph, wherein the graph comprises a set of nodes, a set of edges between pairs of nodes in the set of nodes, and a set of predicates; and
a processing module comprising instructions that, when executed by the one or more processors, cause the system to use one or more of the processes to process the query by:
performing a lookup of a hash map to obtain one or more offsets into a compound store for the graph database, wherein the compound store comprises a set of identity-giving nodes for a set of tuples in the graph database;
accessing the one or more offsets in the compound store to obtain a subset of the tuples matching the query by:
obtaining, from the lookup of the hash map, a first offset in the compound store by matching a key in the query to an entry in the hash map which stores the first offset;
obtaining, from a record at the first offset in an offset store in the compound store, a second offset in the compound structure; and
accessing the subset of the tuples at the second offset in the compound structure;
using the subset of the tuples to generate a result of the query; and
providing the result in a response to the query.

* * * * *